Figure 4:
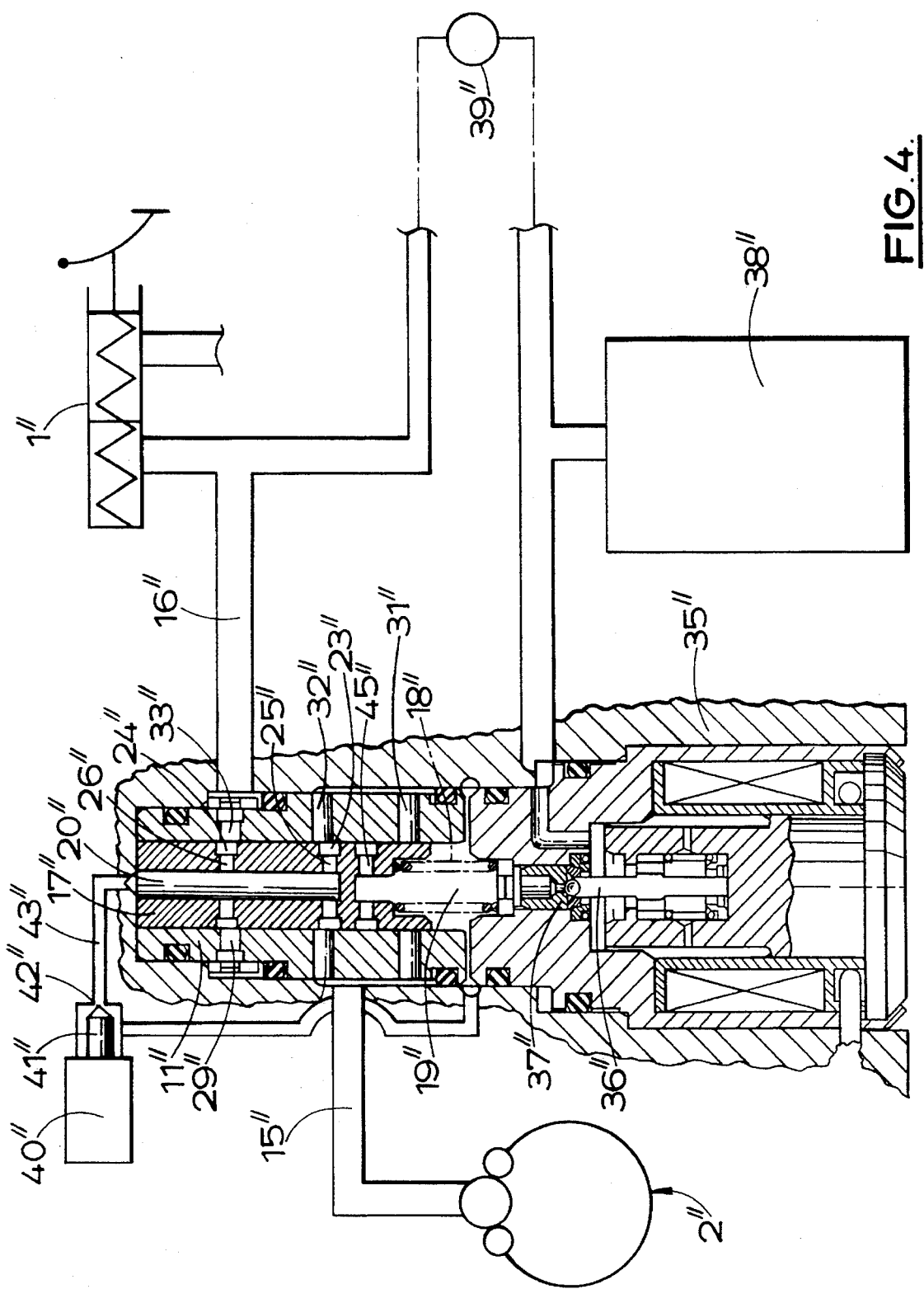

United States Patent [19]

Farr

[11] Patent Number: 5,468,059

[45] Date of Patent: Nov. 21, 1995

[54] HYUDRAULIC ANTI-LOCK BRAKING SYSTEMS FOR VEHICLES

[75] Inventor: Glyn P. R. Farr, Warwickshire, England

[73] Assignee: Lucas Industries public limited company, England

[21] Appl. No.: 278,995

[22] Filed: Jul. 22, 1994

Related U.S. Application Data

[63] Continuation of Ser. No. 857,912, filed as PCT/GB/91/01656, Sep. 25, 1991, published as WO/05991, Apr. 16, 1992, abandoned.

[30] Foreign Application Priority Data

Sep. 28, 1990 [GB] United Kingdom ............... 9021232
Oct. 25, 1990 [GB] United Kingdom ............... 9023259

[51] Int. Cl.⁶ .......................... B60T 8/32; B60T 8/48; B60T 8/50
[52] U.S. Cl. ................... 303/116.1; 303/117.1; 303/119.1; 303/119.2
[58] Field of Search .............. 303/116.1, 116.2, 303/116.3, 116.4, 117.1, 119.1, 119.2, 900, 901, 61–63, 68–69, 72, 113.1, 113.2, 115.1, 115.4, 115.6, DIG. 1–DIG. 4; 188/181 A

[56] References Cited

U.S. PATENT DOCUMENTS

| | | | |
|---|---|---|---|
| 4,350,396 | 9/1982 | Mortimer | 303/115.4 |
| 4,715,666 | 12/1987 | Farr | 303/116.4 |
| 4,765,692 | 8/1988 | Miyake | 303/61 X |
| 4,775,193 | 10/1988 | Farr et al. | 303/9.75 |
| 4,778,227 | 10/1988 | Bayliss | 303/119.2 |
| 4,915,459 | 4/1990 | Hashida et al. | 303/117.1 X |
| 4,929,037 | 5/1990 | Farr | 303/116.4 |
| 4,941,713 | 7/1990 | Farr | 303/116.4 |
| 4,957,330 | 9/1990 | Morikawa et al. | |
| 4,988,148 | 1/1991 | Farr et al. | 303/116.4 |

FOREIGN PATENT DOCUMENTS

| | | |
|---|---|---|
| 0202845 | 11/1986 | European Pat. Off. |
| 0332398 | 9/1989 | European Pat. Off. |
| 0344544 | 12/1989 | European Pat. Off. |
| 2119881 | 11/1983 | United Kingdom. |
| 2183763 | 6/1987 | United Kingdom. |

*Primary Examiner*—Douglas C. Butler
*Attorney, Agent, or Firm*—Laff, Whitesel, Conte & Saret, Ltd.

[57] ABSTRACT

The invention is directed to a hydraulic, anti-skid braking system for a wheeled vehicle. A source of hydraulic or other operating fluid is applied to the brakes of the vehicle. A sensor indicates when the speed of wheel rotation exceeds a predetermined value. Responsive thereto, a modulator assembly modulates a supply of the operating fluid to the vehicle brakes. An electronic control unit controls the modulator assembly in order to isolate the source of operating fluid from the brakes and to relieve the pressure of the operating fluid applied to the brakes. At the termination of a sensor caused signal, there is a re-application of the operating fluid to the brakes at a controlled rate. The modulator assembly has a bore, a valve spool working in the bore, a first normally closed solenoid for operating a valve, a passage between first and second ends of the bore, and a second solenoid operated valve in the passage. The second solenoid operated valve, a passage between first and second ends of the bore, and a second solenoid operated valve in the passage. The second solenoid operated valve controls the re-application of fluid to the brake by establishing a pressure differential across the valve spool, and, in turn, to meter the applying of fluid to the brakes.

18 Claims, 3 Drawing Sheets

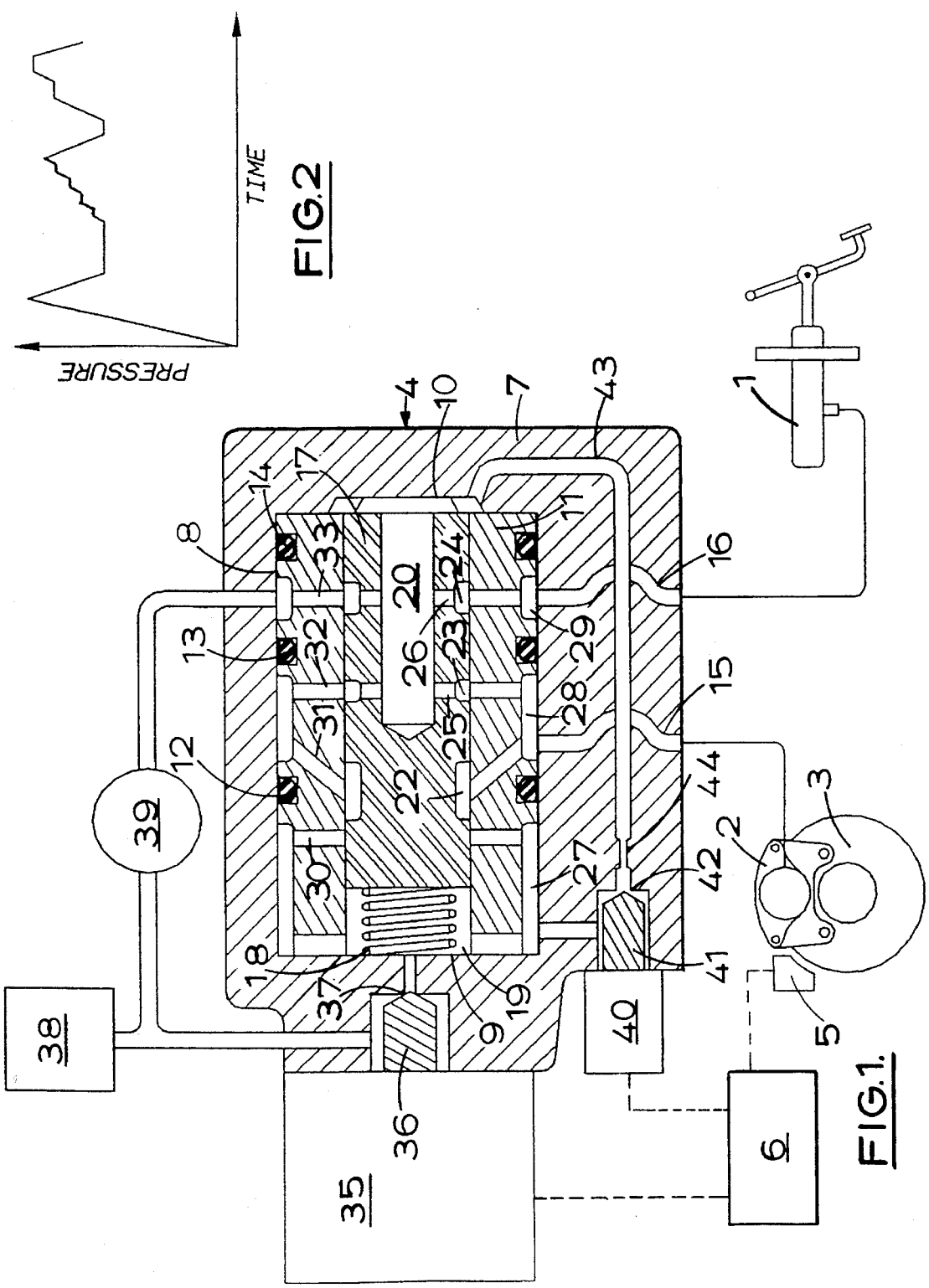

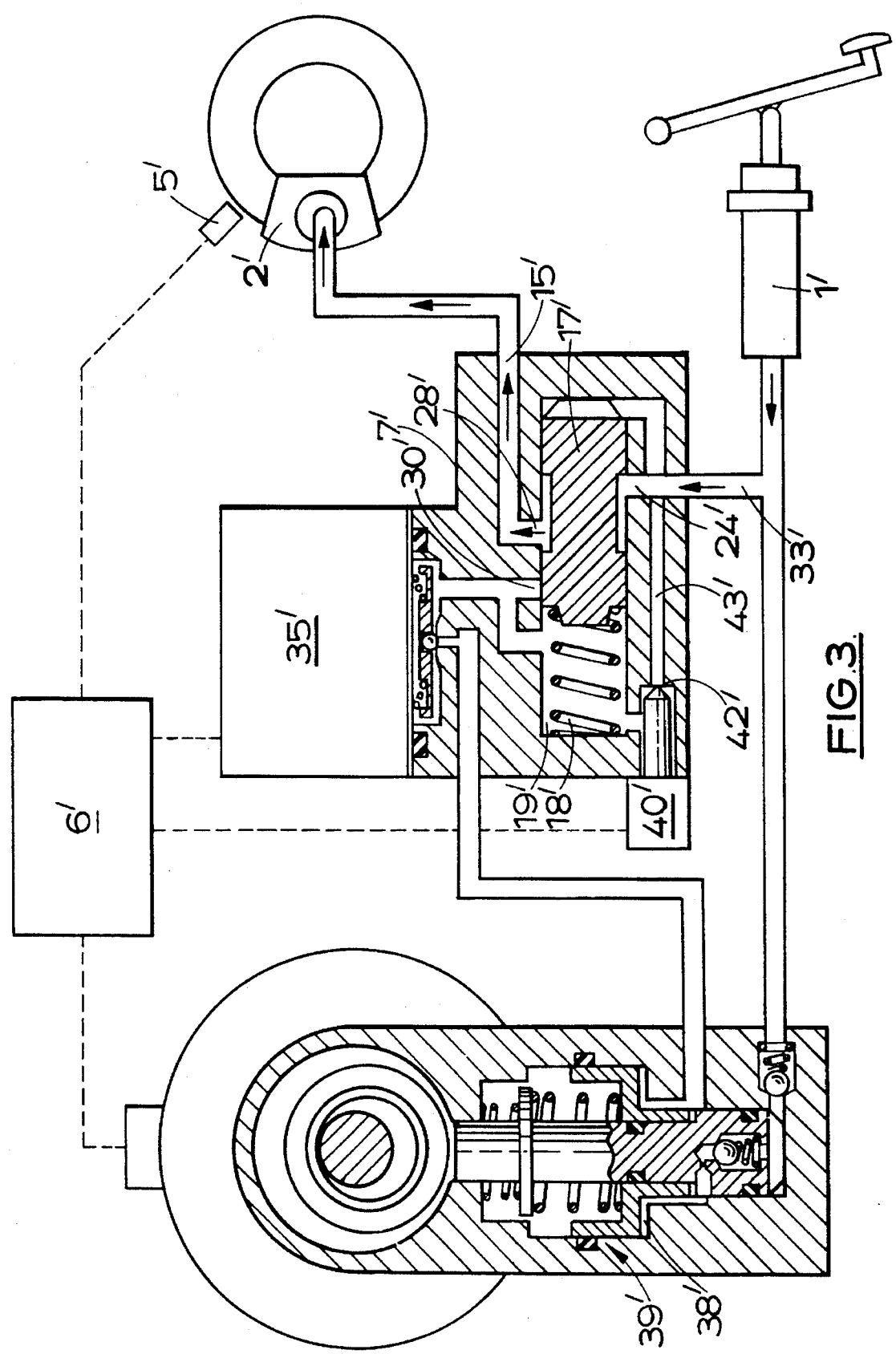

HYUDRAULIC ANTI-LOCK BRAKING SYSTEMS FOR VEHICLES

This application is a continuation of application Ser. No. 07/857,912, filed as PCT/GB91/01656, Sep. 25, 1991, published as WO/05991, Apr. 16, 1992, now abandoned.

This invention relates to hydraulic anti-lock braking systems for vehicles of the kind in which the pressure applied to a braked wheel is controlled in response to signals from an electronic control unit, in turn responsive to signals from a speed sensor associated with the wheel.

Two systems of the kind set forth are known from EP-A-0 202 845 and EP-A-0 344 544. In these systems a flow control valve operates with a single acting normally closed solenoid-operated valve to provide effective control of the pressure in the braked wheel in response to signals from the electronic control unit, and the rate of brake re-application following the recovery of a braked wheel is determined by the operation of the flow valve which meters fluid from an inlet to an outlet at a rate determined by a pressure drop across an orifice in a spool, which pressure drop is dependent upon the force of a control spring and the area of the spool, and the flow through a variable orifice defined between a port in a housing in which the spool is movable, and an annular groove in the spool.

If the flow rate can be interrupted, the effective re-application rate can be varied from zero to a predetermined maximum. This additional feature will permit an ideal application rate dependent upon road surface conditions and provide a hold feature, that is, the pressure is held steady in order to facilitate brake intervention for traction control and will provide a larger interval to enhance the ability of the wheel to recover its true speed on a slippery road surface.

According to our invention, in an hydraulic anti-lock braking system of the kind set forth a flow control valve operates in conjunction with a first single acting normally closed solenoid-operated valve, and the rate of brake re-application following recovery of a braked wheel is determined by a second solenoid-operated valve which acts to establish a pressure differential across a valve spool, in turn to meter the supply of brake-applying fluid to the brake.

The second solenoid-operated valve therefore replaces a fixed orifice normally associated with known flow control valves and incorporated in the spools of such valves.

Conveniently the pressure drop across the second solenoid-operated valve is determined by the area of the spool and the force in a spring acting on the spool.

The area of the valve seat is chosen to be substantially equal to the area of a normal fixed orifice. Thus when the second solenoid-operated valve is open the flow control valve operates in a similar manner to known flow control valves, except that the valve seat which constitutes the fixed orifice is disposed in the housing or body of the valve as opposed to the spool.

The second solenoid-operated valve is controlled by signals from the electronic control unit and can be either open or shut, or it can be pulsed to achieve a restricted flow.

Some embodiments of our invention are illustrated in the accompanying drawings in which:

FIG. 1 is a layout of an hydraulic anti-lock braking system for a vehicle;

FIG. 2 is a graph of brake pressure plotted against time;

FIG. 3 is a layout of another anti-lock braking system;

FIG. 4 is a layout of another braking system;

The braking system illustrated in FIG. 1 of the accompanying drawings comprises a pedal-operated hydraulic master cylinder 1 for applying a brake 2 on a wheel 3 of a vehicle through a modulator assembly 4. The behaviour of the wheel is sensed by a wheel speed sensor 5 which sends signals to an electronic control unit 6, and the signals are differentiated by the unit which, in turn, emits an energising current to control operation of the modulator assembly 4.

The modulator assembly 4 comprises a housing 7 having a longitudinal bore 8 extending between axially spaced faces 9, 10 at opposite ends of the housing 7. A sleeve 11 received in the bore 8 is provided with three annular seals 12, 13, 14 of which the seals 12 and 13 are disposed on opposite sides of an outlet passage 15 leading to the brake 2, and the seals 13 and 14 are disposed on opposite sides of an inlet passage 16 from the master cylinder 1.

A spool 17 works in the bore of the sleeve 11 and is biased against the face 10 by a spring 18 housed in a chamber 19 between the opposite end of the spool 17 and the face 9. The spool 17 has a central passage in the form of a blind drilling 20 leading from the face 10. The spool 17 is also provided with three, external, annular grooves 22, 23, 24 of which the two grooves 23, 24 furthest from the spring chamber 19 have radial passages 25, 26 communicating with the drilling 20.

The sleeve 11 has three grooves 27, 28, 29 and four cross passages 30, 31, 32, 33 adapted to connect with the grooves 22, 23, 24 in either a quiescent or transient state.

A single acting solenoid operated dump valve 35 has a valve member 36 which normally engages with a seating 37 in the housing 7 to isolate the spring chamber 19 from an expander chamber 38, and a pump 39 is adapted to withdraw fluid from the expander chamber 38 and return it to the cross passage 33.

A second solenoid-operated valve 40 acting as a re-apply and hold solenoid valve comprises a valve member 41 for engagement with a seating 42 at the end of a passage 43 which leads to the rear of the spool 17 and the central drilling 20.

The passage 43 has a predetermined restriction either formed separately or established by the interaction of the secondary valve 40 and its seat 42. In the illustrated embodiment the passage 43 is provided both with a separately formed restriction 44 and with a restriction established by the interaction of the secondary valve 40 and its seat 42.

When the second valve 40 is closed it isolates the passage 43 from the spring chamber 19, and when it is open the chamber 19 and the passage 43 are in free communication.

The valve seating 42 has an area substantially the same as the area of a fixed restrictor normally provided in the end of the spool 17 which is adjacent to the chamber 19.

The spring 18 housed between the spool 17 and end face 9 may alternatively be housed between the spool 17 and end face 10 provided that it acts in a direction to expand the volume of the spool chamber between the main solenoid valve 35 and the predetermined restriction.

In a normal inoperative position for normal brake operation the solenoid valve 35 is closed and the solenoid valve 40 is open. Fluid from the master cylinder 1 passes freely through the cross passages 33, the radial passages 26, the central drilling 20, the radial passages 31 and the outlet passage 15 to the brake 2.

Upon receipt of a skid signal from the electronic control unit 6, the secondary valve 40 closes and the solenoid-operated valve 35 opens to connect the spring chamber 19 to the expander chamber 38.

When the pressure differential across the area of the spool 17 subjects the spool 17 to a force sufficient to overcome the force of the spring 18, the spool 17 moves to:

a) Isolate the inlet 16 from the outlet 15;

b) Connect the outlet 15 to the expander chamber 38; and c) Attain its metering position defined by a variable orifice constituted by the co-operation of the groove 24 with the passages 33 with the edge on the input side.

The reduction in pressure permits a recovery of the wheel 3, the skid signal is cancelled, and the solenoid-operated valve 35 is closed. The spool 17, however, remains in its metering position with the outlet 15 and the spring chamber 19 interconnected whilst the output pressure is less than the input pressure.

Upon brake re-application the metering edge of the spool 17 comprising the leading edge of the groove 24 acts as a valve element, the dump valve 35 closes and the assembly goes into the brake re-apply phase. Specifically the pump 39 withdraws fluid from the expander chamber 38 and pumps it into the central drilling 20 and through the external passage 43 to the valve seating 42 which defines a fixed restrictor or external orifice.

If the wheel recovery is rapid, the secondary valve 40 is fully opened so that fluid passes through the open orifice 42 into the spring chamber 19 to balance the forces which determine the extent of the metering, and fluid further passes through the spool 17 and the sleeve 11 to the brake. As the flow passes through the spring chamber 19 it purges away any trapped air. Under these conditions the modulator assembly 4 re-applies the brake at a maximum rate determined by the characteristics of the flow valve.

Should the wheel acceleration be slow the second solenoid valve 40 is closed and the brake pressure held constant, and in accordance with signals from the electronic control unit 6, subsequent pulsing of the valve 40 prevents pressure build up in the chamber 19 and increases brake pressure in steps to simulate a reduced rise rate. The spool 17 is held in a closed position with the metering edge acting as a control valve. This is achieved without encountering any of the problems of using highly loaded valves.

The solenoid of the second valve 40 can be relatively small since it has to close only against a relatively small differential, say 2–3 bar, which is calculated by the load in the spring 18 acting on the spool 17. This small differential permits accurate control of the effective brake pressure rise rate by the solenoid valve 40. The output to the valve 40 from the electronic control unit 6 takes little power and the small force to close the secondary valve 40 against the differential produces a fast acting response and in consequence the solenoid valve 40 can cycle very fast to determine flow rate. The secondary solenoid valve 40 acts, therefore, as a pilot control to the flow control valve.

If the brake 2 is to be isolated in a traction mode, both solenoid valves are energised. When an input pressure is applied, the spool 17 moves across to isolate the input 16 and connect the brake to the expander 38. Fluid in the expander is returned to the input when the motor driven pump 39 is energised.

If the brake 2 is to be connected for a traction mode, fluid pressure passes from the input 16 to the brakes. When the wheel spin starts to recover, the secondary valve is closed to maintain the pressure at that level. On control of the wheel 3, the main solenoid 35 is pulsed to relieve brake pressure and the motor driven pump 39 is energised to return fluid back to the inlet.

The characteristics achieved by the modulator assembly 4 utilised in the braking system of FIG. 1 are illustrated in the graph of FIG. 2 in which brake pressure (P) is plotted against time (t).

The braking system illustrated in the layout of FIG. 3 is similar to that of FIG. 1 and like reference numerals have been applied to like parts, although in FIG. 3 the modified parts have been designated 1',2',3' etc. In this construction the spool 17' is solid with a central annular groove 28' normally to transmit fluid from the input 16' to the output 15'. No fixed orifice is provided in the spool 17'. Instead the seating 42' of the second valve 40' defines a fixed restrictor or external orifice. In ABS mode, the spool 17' moves to isolate the input from the output and the groove 28' now connects the output with the chamber leading to the main solenoid valve 35'.

The braking system illustrated in FIG. 4 of the accompanying drawings is also similar to the layout of FIGS. 1 and 3 and like reference numerals have been applied to like parts, although in FIG. 4 the modified parts have been designated 1",2",3" etc. Again no fixed orifice is provided in the spool 17" and the fixed orifice is provided in the spool 17" and the seating 42" of the second valve 40" defines a fixed restrictor or external orifice.

In this construction the spool 17" is centre drilled at both ends to connect the three radial passages, two on the input side 25",26" and one 45" on the side adjacent to the chamber leading to the main solenoid valve 35". In normal operation the two cross passages 32",33" in combination with the first radial passage 26" communicate the input 16" with the output 15".

In ABS mode, the spool 17" moves to isolate the input from the output and connects the output, via the third cross passage 31" and the third radial passage 45" to the chamber leading to the main solenoid valve.

The operation of the two systems of FIGS. 3 and 4 are similar to that of FIG. 1 and need not be further described herein.

I claim:

1. An hydraulic anti-skid braking system for a vehicle having a wheel, and comprising a brake for braking said wheel, a brake actuation means, a source of operating fluid for applying said brake in addition to said brake actuation means, sensing means for sensing the speed of rotation of said wheel and generating signals indicative of speed of rotation of said wheel, an electronic control unit connected to said sensing means, a modulator assembly between said brake and said source, for modulating a supply of operating fluid to said brake from said source, said electronic control unit controlling said modulator in accordance with said signals from said sensing means, said modulator assembly incorporating means responsive to said electronic control unit to isolate said brake actuation means from said brake and relieve the pressure of said operating fluid applied to said brake and, at the termination of said signal, to control a re-application of said brake at a controlled rate, wherein said modulator assembly comprises means defining a bore, a valve spool working in said bore, a first solenoid operated valve disposed in a first passage extending from said source to said brake, a second passage between first and second ends of said first passage, and a second solenoid operated valve in said second passage, said second solenoid operated valve determining said re-application of said brake by establishing a pressure differential across said valve spool, in turn to meter said supply of brake applying fluid to said brake.

2. An anti-lock system according to claim 1, wherein a spring acts on said spool and a pressure drop across said second solenoid-operated valve is determined by the area of said spool and the force in said spring acting on said spool.

3. An anti-lock system according to claim 1, wherein said second solenoid-operated valve comprises a valve member, and a seating for engagement by said valve member.

4. An anti-lock system according to claim 3, wherein said valve spool is provided with a spring chamber at said first end.

5. An anti-lock system according to claim 4, wherein said first solenoid-operated valve is adapted to isolate said spring chamber from an expander chamber.

6. An anti-lock system according to claim 4, wherein said valve spool has a central passage.

7. An anti-lock system according to claim 6, wherein said valve spool is provided with three external annular grooves of which the two grooves furthest from said spring chamber have radial passages communicating with the central passage.

8. An anti-lock system according to claim 7, wherein said valve spool works in a sleeve, said sleeve having three grooves and four cross-passages adapted to connect with said annular grooves of said valve spool.

9. An anti-lock system according to claim 8, wherein said pump is adapted to withdraw fluid from said expander chamber and return it to the cross-passage furthest from said spring chamber.

10. An anti-lock system according to claim 8, wherein metering of said operating fluid to said brake is attained by the co-operation of the valve spool groove furthest from said spring chamber with the cross passage furthest from said spring chamber with the edge on the input side.

11. An anti-lock system according to claim 3, wherein said valve spool is provided with a spring chamber at said first end and said second passage between said first and second ends of the bore also includes a passage leading from said seating to said second end of said valve spool.

12. An anti-lock system according to claim 1, wherein said second solenoid operated valve is controlled by signals from said electronic control unit.

13. An anti-lock system according to claim 1, wherein said valve spool has a central annular groove adapted normally to transmit fluid from an input from said source of operating fluid to an output to said brake.

14. An anti-lock system according to claim 13, wherein metering of the brake-operating fluid to said brake is attained by the groove connecting said output to a chamber leading to said first solenoid-operated valve.

15. An anti-lock system according to claim 1, wherein said valve spool is centre drilled at both ends to connect with three radial passages, the first centre drilling connecting with first and second radial passages on the side of an input from said source of operating fluid, the second centre drilling connecting with the third radial passage on the side of said valve spool adjacent to a chamber leading to said first solenoid-operated valve.

16. An anti-lock system according to claim 15, wherein said valve spool works in a sleeve, said sleeve having grooves and cross-passages adapted to connect with said first and second radial passages on said input side of said valve spool.

17. An anti-lock system according to claim 15, characterised in that a pump is adapted to withdraw fluid from the expander chamber and return it to the cross passage furthest from the spring chamber.

18. An anti-lock system according to claim 15, wherein metering of the brake-operating fluid to said brake is attained via the cross-passage nearest said spring chamber and the third radial passage to the chamber leading to said first solenoid-operated valve.

* * * * *